US011665521B2

(12) United States Patent
Wu

(10) Patent No.: US 11,665,521 B2
(45) Date of Patent: May 30, 2023

(54) COMMUNICATING ALERT TO ADDITIONAL CONTACTS

(71) Applicant: ARRIS Enterprises LLC, Suwanee, GA (US)

(72) Inventor: Jinghui Wu, Shenzhen (CN)

(73) Assignee: ARRIS Enterprises LLC, Suwanee, GA (US)

(*) Notice: Subject to any disclaimer, the term of this patent is extended or adjusted under 35 U.S.C. 154(b) by 155 days.

(21) Appl. No.: 15/541,324

(22) PCT Filed: Aug. 17, 2015

(86) PCT No.: PCT/CN2015/087275
§ 371 (c)(1),
(2) Date: Jun. 30, 2017

(87) PCT Pub. No.: WO2017/028166
PCT Pub. Date: Feb. 23, 2017

(65) Prior Publication Data
US 2020/0015058 A1 Jan. 9, 2020

(51) Int. Cl.
H04W 4/90 (2018.01)
H04W 76/50 (2018.01)
H04L 67/306 (2022.01)
H04W 4/14 (2009.01)
H04M 1/72421 (2021.01)
H04L 67/55 (2022.01)

(52) U.S. Cl.
CPC ............ H04W 4/90 (2018.02); H04L 67/306 (2013.01); H04L 67/55 (2022.05); H04M 1/72421 (2021.01); H04W 4/14 (2013.01); H04W 76/50 (2018.02)

(58) Field of Classification Search
CPC .......... H04W 4/90; H04W 76/50; H04W 4/14
See application file for complete search history.

(56) References Cited

U.S. PATENT DOCUMENTS

2006/0172720 A1* 8/2006 Islam .............. H04M 1/274566
455/404.1
2008/0240148 A1* 10/2008 Taub ..................... H04W 76/50
370/462
2010/0190468 A1* 7/2010 Scott ................... H04M 1/2745
455/404.2
2010/0295674 A1* 11/2010 Hsieh .................. A61B 5/0002
340/539.12

(Continued)

Primary Examiner — Jinsong Hu
Assistant Examiner — Farideh Madani
(74) Attorney, Agent, or Firm — Panitch Schwarze Belisario & Nadel LLC

(57) ABSTRACT

Methods, systems, and computer readable media can be operable to facilitate the output of communications to additional emergency contacts upon the occurrence of an alarm triggering event. A central device may be configured with one or more data profiles associated with one or more emergency contacts, and each data profile may include emergency contact information associated with one or more methods for communicating a message to each respective emergency contact. When the device identifies an alert trigger within one or more communications passing through the device, the device may output one or more emergency messages to one or more of the emergency contacts according to the one or more stored data profiles.

19 Claims, 7 Drawing Sheets

(56) References Cited

U.S. PATENT DOCUMENTS

| | | | | |
|---|---|---|---|---|
| 2011/0300825 | A1* | 12/2011 | Lundgren | G06Q 20/10 |
| | | | | 455/404.1 |
| 2012/0190325 | A1* | 7/2012 | Abu-Hakima | H04W 4/90 |
| | | | | 455/404.2 |
| 2015/0140924 | A1* | 5/2015 | Marathe | H04W 4/90 |
| | | | | 455/3.01 |
| 2016/0021683 | A1* | 1/2016 | Sood | H04W 76/50 |
| | | | | 455/404.1 |
| 2016/0192163 | A1* | 6/2016 | Miner | G01S 19/24 |
| | | | | 455/404.1 |
| 2016/0196731 | A1* | 7/2016 | Aich | G08B 25/08 |
| | | | | 340/539.17 |
| 2016/0343239 | A1* | 11/2016 | Lamb | G08B 25/10 |

\* cited by examiner

COMMUNICATING ALERT TO ADDITIONAL CONTACTS

TECHNICAL FIELD

This disclosure relates to outputting messages to emergency contacts.

BACKGROUND

A central device, such as a gateway, cable modem, multimedia terminal adapter (MTA), or embedded MTA (EMTA) may be used at a customer premise to route communications between subscriber/client devices and one or more upstream networks. Typically, the central device can be used to provide multiple services to a user such as video, data, and/or voice services. Thus, the central device may receive most of, if not all communications entering and exiting the subscriber premise.

In the event of an emergency or alarm event occurring at a subscriber premise, the central device may be used by the subscriber to facilitate the placing of an emergency call or the output of an emergency communication. For example, when an emergency arises at a subscriber premise, the subscriber can attempt to contact emergency services by dialing an emergency number (e.g., 911). However, time constraints created by the immediacy that arises in an emergency event, coupled with resource limitations at a central device may preclude the subscriber from informing other contacts that might be of assistance to the subscriber in an emergency situation. For example, it can be beneficial for a subscriber to have the ability to not only inform an emergency response service (e.g., 911 call center) of an emergency situation, but also to inform other contacts of the emergency situation. These other contacts can include, by way of example, relatives, friends, or neighbors of the subscriber. Therefore, it is desirable to improve upon methods and systems for outputting an alert to emergency contacts.

BRIEF DESCRIPTION OF THE DRAWINGS

Like reference numbers and designations in the various drawings indicate like elements.

DETAILED DESCRIPTION

Figure 1:
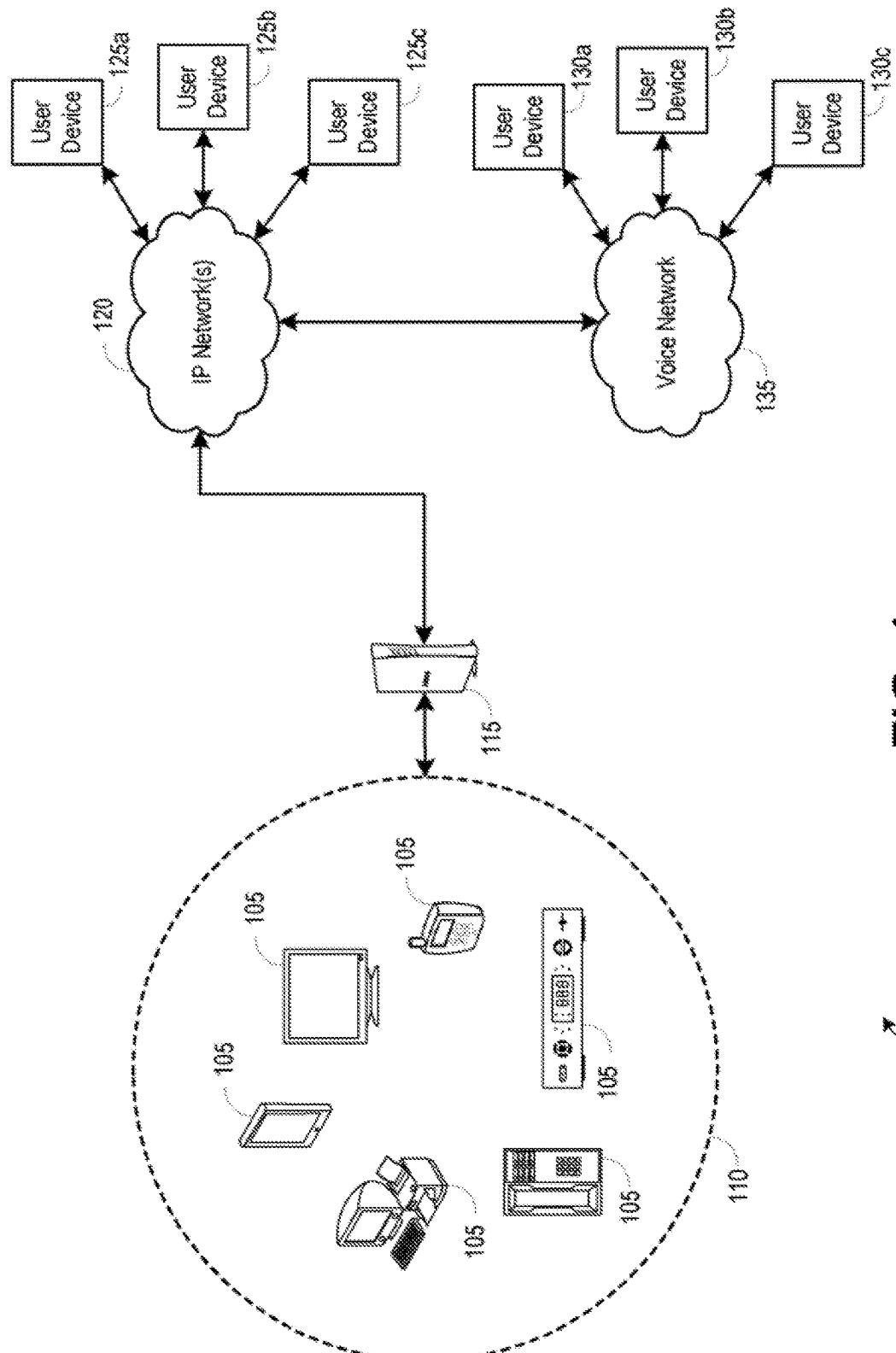
FIG. 1 is a block diagram illustrating an example network environment operable to facilitate the output of communications to additional emergency contacts upon the occurrence of an alarm triggering event.

It is desirable to improve upon methods and systems for outputting an alert to emergency contacts. Methods, systems, and computer readable media described herein can be operable to facilitate the output of communications to additional emergency contacts upon the occurrence of an alarm triggering event. A central device may be configured with one or more data profiles associated with one or more emergency contacts, and each data profile may include emergency contact information associated with one or more methods for communicating a message to each respective emergency contact. When the device identifies an alert trigger within one or more communications passing through the device, the device may output one or more emergency messages to one or more of the emergency contacts according to the one or more stored data profiles.

An embodiment of the invention described herein may include a method comprising: (a) identifying an emergency alert trigger at a central device; (b) determining one or more emergency contacts associated with the central device; (c) determining one or more communication methods associated with each of the one or more emergency contacts; and (d) outputting one or more messages to at least a respective one of the one or more emergency contacts using at least one of the one or more communication methods associated with the respective emergency contact.

According to an embodiment of the invention, identifying the emergency alert trigger comprises matching a string of dialed numbers with a telephone number designated at the central device as an emergency telephone number.

According to an embodiment of the invention, one or more of the messages comprise audio recordings.

According to an embodiment of the invention, one or more of the messages are output to one or more emergency contacts as a short message service message.

According to an embodiment of the invention, one or more of the messages are output to one or more emergency contacts as a message associated with a social media account.

According to an embodiment of the invention, one or more communication methods are associated with an emergency contact based upon user input received through a graphical user interface.

According to an embodiment of the invention, one or more messages are output to an emergency contact using a plurality of communication methods in an order based on a prioritization of the communication methods.

According to an embodiment of the invention, the one or more messages are output to the one or more emergency contacts in an order based upon a prioritization of the emergency contacts.

An embodiment of the invention described herein may include an apparatus comprising: (a) an interface configured to be used to receive communications from one or more associated devices; (b) a module configured to: (i) identify an emergency alert trigger within the communications received from the one or more associated devices; (ii) determine one or more emergency contacts; (iii) determine one or more communication methods associated with each of the one or more emergency contacts; and (c) an interface configured to be used to output one or more messages to at least a respective one of the one or more emergency contacts using at least one of the one or more communication methods associated with the respective emergency contact.

An embodiment of the invention described herein may include one or more non-transitory computer readable media having instructions operable to cause one or more processors to perform the operations comprising: (a) identifying an emergency alert trigger at a central device; (b) determining one or more emergency contacts associated with the central device; (c) determining one or more communication methods associated with each of the one or more emergency contacts; and (d) outputting one or more messages to at least a respective one of the one or more emergency contacts using at least one of the one or more communication methods associated with the respective emergency contact.

FIG. 1 is a block diagram illustrating an example network environment 100 operable to facilitate the output of communications to additional emergency contacts upon the occurrence of an alarm triggering event. In embodiments, video, voice, and/or data services may be delivered to one or more client devices 105 over one or more data paths. Client devices 105 may include a television, mobile device, tablet, computer, set-top box (STB), telephone, gaming device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, telephony services, and others. It should be further understood that the devices shown in FIG. 1 may be integrated. For example, a television may be connected to and controlled by a STB.

Multiple services may be delivered to client devices 105 over one or more local networks 110. The local network(s) 110 may include a local area network (LAN), wireless local area network (WLAN), personal area network (PAN), Multimedia over Coax Alliance (MoCA) network, mobile hotspot network, and others. The local network 110 may be provided at a subscriber premise by a central device 115. The central device 115 may include any device configured to facilitate communications between an upstream network and one or more client devices 105, such as a modem, multimedia terminal adapter (MTA), embedded MTA (EMTA), gateway device, mobile device such as a cellular telephone smart telephone, tablet, or other access device. The central device 115 may be integrated with other devices. For example, a modem may reside within a gateway device, STB, or other devices. It should be understood that delivery of the multiple services over the local network(s) 110 may be accomplished using a variety of standards and formats. It will be appreciated by those skilled in the relevant art that client devices 105 may be capable of interacting and communicating with each other and/or with a central device 115 over various wireless communication standards (e.g., Wi-Fi, Bluetooth, etc.).

In embodiments, the central device 115 may route communications between one or more client devices 105 and one or more user devices located outside of the area serviced by the one or more local networks 110 over one or more Internet protocol (IP) networks 120. For example, communications targeted for a user device 125a-c may be routed through one or more IP networks 120 to the targeted user device 125a-c. User devices 125a-c may include mobile devices, tablets, computers, IP telephony devices, and any other device configured to receive communications via a connection to an IP network.

In embodiments, the central device 115 may provide one or more telephony lines wherein each line may be used to establish a communication session between one or more client devices 105 and one or more user devices located outside of the area serviced by the one or more local networks 110. For example, the central device 115 may establish a session between one or more client devices 105 and one or more user devices 130a-c through a voice network 135. User devices 130a-c may include telephony devices configured to receive communications via a connection to the voice network 135. It should be understood that a session may be established by routing communications from an IP network 120 to a voice network 135 (e.g., at an upstream switching or gateway device). It will be appreciated by those skilled in the relevant art that a voice network 135 may be a public switched telephone network (PSTN), cellular or mobile network (e.g., 2G, 3G, etc.), a satellite network, or any other network operable to route voice communications.

In embodiments, the central device 115 may be configured to monitor incoming traffic from the local network 110 or from the one or more client devices 105 associated with the central device 115, and to identify, within the incoming traffic, a trigger that signals the occurrence of an alarm or emergency event. The trigger signaling the alarm or emergency event may be a call being placed to an emergency call center by a client device 105, the triggering of a premise alarm system, or any other signal received at the central device 115 that indicates the occurrence of an alarm or emergency event. It should be understood that where the trigger is a dialed number, the dialed number may be associated with various networks and/or standards (e.g., Global System for Mobile Communications (GSM), Code-Division Multiple Access (CDMA), Wideband Code-Division Multiple Access (WCDMA), satellite numbers, etc.).

In embodiments, when the central device 115 identifies a trigger signaling an alarm or emergency event, the central device 115 may output an emergency communication to a primary emergency contact (e.g., predetermined or dialed emergency call center) and may output one or more emergency communications to one or more additional emergency contacts. A user may configure the central device 115 with information for contacting additional emergency contacts (e.g., friends, relatives, neighbors, etc.), the information including, but not limited to, one or more types of communication methods to use to deliver an emergency message to each additional emergency contact, unique communication identifiers (e.g., phone number, electronic mail address, social media identifier, etc.), and various other parameters that may control when and when not to output an emergency message to an additional emergency contact. A user may configure the central device 115 with emergency contact information through a GUI output from the central device 115 to a display device connected to or otherwise associated with the central device 115. When a trigger signaling an alarm or emergency event is identified, the central device 115 may use the configured information to output one or more emergency messages to one or more additional emergency contacts.

In embodiments, one or more emergency messages may be defined at the central device 115. Emergency messages may include real time or pre-recorded voice messages. For example, when an emergency or alarm trigger is identified, the central device 115 may establish, through the voice network 135 via an IP network, a connection (e.g., call session) between a client device 105 and a user device 125*a-c* or user device 130*a-c* associated with an additional emergency contact such that a real time emergency message or a pre-recorded emergency message may be delivered to the additional emergency contact. Emergency messages may include text messages that may be output to an emergency contact as an electronic mail message, short message service (SMS) message, instant message, private message sent through a social media site, and others. For example, the text message may be sent from the central device 115 to a user device 125*a-c* or user device 130*a-c* associated with an emergency contact through one or more IP networks 120. A generic emergency message may be created and associated with one or more additional emergency contacts and/or communications methods. Unique emergency messages may be created and associated with a specific additional emergency contact and/or communication method.

Figure 2:
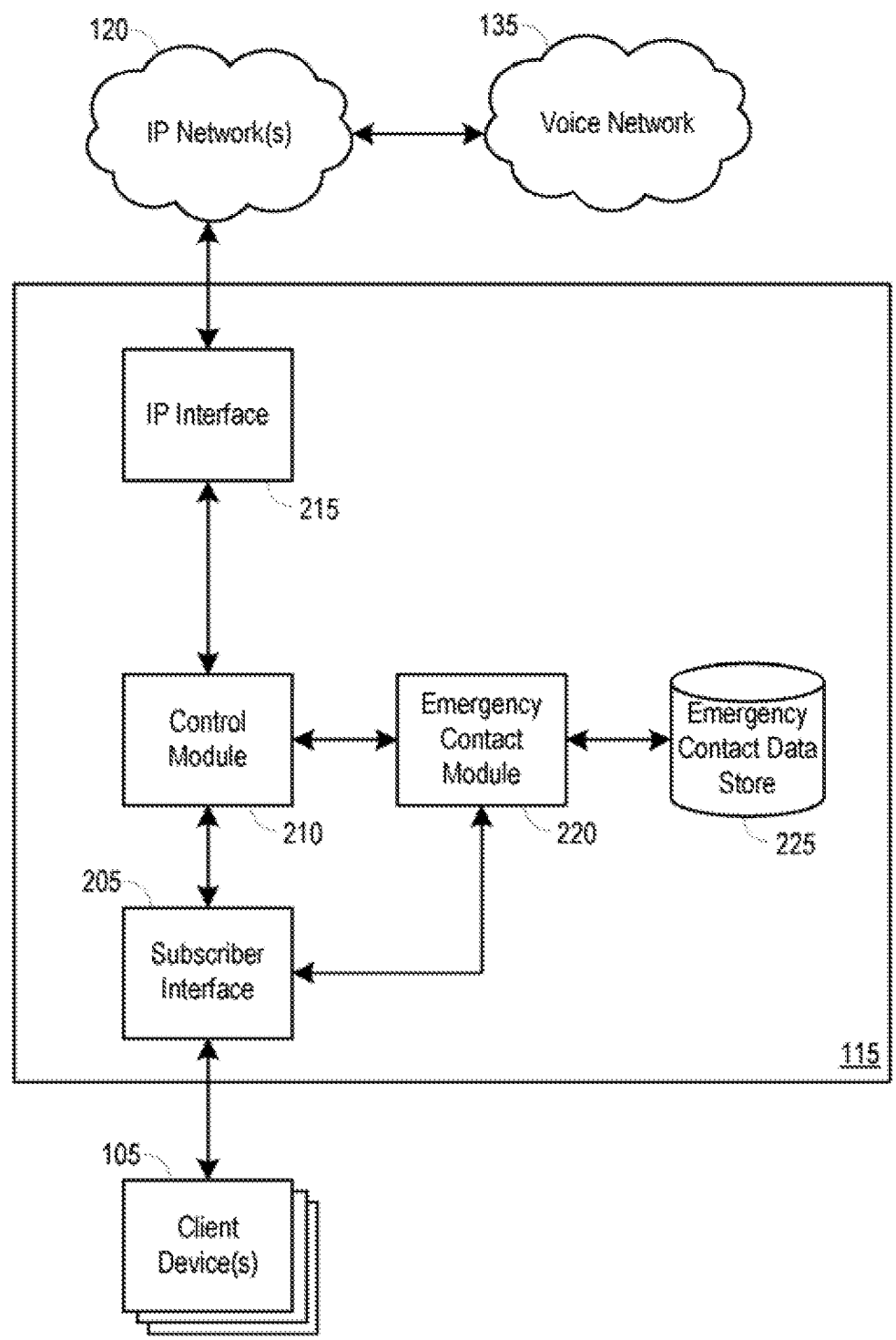
FIG. 2 is a block diagram illustrating an example central device operable to facilitate the output of communications to additional emergency contacts upon the occurrence of an alarm triggering event.

FIG. 2 is a block diagram illustrating an example central device 115 operable to facilitate the output of communications to additional emergency contacts upon the occurrence of an alarm triggering event. The central device 115 may include a subscriber interface 205, a control module 210, an IP interface 215, an emergency contact module 220, and an emergency contact data store 225. In embodiments, the central device 115 may be a modem and can operate as a standalone device or can be integrated with other devices such as a gateway device, MTA, STB, or others.

In embodiments, incoming communications may be received from one or client devices 105 through one or more subscriber interfaces 205. Data, video, and/or voice communications may be received through the one or more subscriber interfaces 205. It should be understood that a subscriber interface 205 may be configured to receive and/or output communications using various communication techniques, protocols, and standards (e.g., Ethernet, Wi-Fi, Multimedia over Coax Alliance (MoCA), twisted pair, etc.). The subscriber interface 205 may include a line card or any other component configured to connect the central device 115 with a telephony device.

In embodiments, communications received through one or more subscriber interfaces 205 may be processed for output by a control module 210. The control module 210 may tag, package, and/or otherwise process a received communication for output through a corresponding interface. The control module 210 may output packets to one or more IP networks 120 through an IP interface 215 and may route communications to a voice network 135 through one or more IP networks 120.

In embodiments, the emergency contact module 220 may receive user input defining a data profile for each of one or more emergency contacts. For example, the emergency contact module 220 may generate a graphical user interface (GUI) that is configured to prompt a user to input information associated with one or more emergency contacts, and the GUI may be output to a user through the subscriber interface 205. Using the GUI, or any other means for configuring the central device 115, a user may input an emergency contact identifier (e.g., name of emergency contact, relationship of emergency contact to user, etc.), one or more methods for communicating with the emergency contact (e.g., telephone call, text message, electronic mail, social media message, etc.), contact information associated with each of one or more defined communication methods (e.g., phone number, electronic mail address, unique social media identifier, etc.), and one or more emergency messages. An emergency message may be a message that is unique to a specific emergency contact or may be a global message to output to a plurality of emergency contacts, and emergency messages may include text messages or pre-recorded voice messages. The emergency contact module 220 may create a data profile for each of one or more emergency contacts, may associate the user input information with a corresponding data profile, and may store each of the one or more data profiles at the emergency contact data store 225.

In embodiments, user account information (e.g., password, unique identifier, etc.) associated with the user's social media account(s) may be received by the emergency contact module 220 and may be associated with one or more emergency contact data profiles. When delivery of a social media message is a defined communication method for the output of an emergency message to an emergency contact, the user's social media account information may be used by the emergency contact module 220 to access the user's social media account (e.g., messaging service, contacts list, etc.) and to generate and output a social media message to the emergency contact.

In embodiments, the control module 210 may identify an emergency alert trigger. An emergency alert trigger may include a call being placed to a certain emergency entity (e.g., 911 call or call to any other emergency response entity), an alarm being triggered within a customer premise, or any other signal that may be used to communicate to the central device 115 that an emergency condition has occurred. For example, the control module 210 may monitor incoming communications that are received through the subscriber interface(s) 205. The control module 210 may monitor one or more telephone lines, and the control module 210 may be configured to detect when an emergency call has been dialed by identifying a unique number associated with an emergency call (e.g., 911). One or more emergency numbers may be configured and stored using various configuration and storage techniques (e.g., simple network management protocol (SNMP), management information base (MIB), etc.).

In embodiments, the subscriber interface 205 (e.g., line card) may monitor and report dialed digits that are received from a telephony device to, for example, the control module 210 or emergency contact module 220. The control module 210 or emergency contact module 220 may compare a string of dialed digits (e.g., a telephone number) to one or more telephone numbers that have been configured at the central device 115 as emergency numbers (e.g., 911 or any other number designated as an emergency number). If a string of dialed digits is determined by the control module 210 or emergency contact module 220 to be equal to an emergency number, the emergency contact module 220 may begin a process for determining whether one or more emergency messages are to be output to one or more emergency contacts. It should be understood that multiple telephone numbers may be configured at a central device 115 as emergency numbers, and that telephone numbers configured as emergency numbers may be telephone numbers that are not associated with an emergency response center.

The control module 210 may output a primary emergency communication. The primary emergency communication may be the call to an emergency response center that acted as the emergency alert trigger. The control module 210 may establish a communication session with the called emergency response center or other called party (e.g., through an IP network 120 or voice network 135 via the IP interface 215).

When the control module 210 identifies an emergency alert trigger, the control module 210 may communicate with the emergency contact module 220 to determine whether one or more emergency communications are to be output to one or more additional emergency contacts. In embodiments, the emergency contact module 220 may determine whether one or more emergency communications are to be output to one or more additional emergency contacts based upon one or more emergency contact data profiles being established, and may be further based upon any number of pre-configured parameters that dictate when an additional emergency contact is to be contacted. For example, the emergency contact module 220 may check for and retrieve one or more data profiles associated with one or more emergency contacts from the emergency contact data store 225.

It should be understood that various parameters may control whether an emergency contact is to be contacted. For example, parameters for determining whether to output an emergency message to an emergency contact may include, but are not limited to certain times of the day during which the emergency contact may be contacted, established associations between emergency contacts and different types of alert triggers (e.g., a setting within a data profile may require that a certain emergency contact is contacted when a call is placed to an emergency response center, but that the certain emergency contact is not contacted when an alarm is triggered within an associated subscriber premise), whether a connection with a primary or higher priority emergency contact has been successfully established, and others.

The emergency contact module 220 may pass information gathered from each data profile (e.g., emergency contact identifier, defined communication method(s), contact information, pre-configured text or pre-recorded voice messages, etc.) retrieved from the emergency contact data store 225 to the control module 210, and, using the information gathered from each data profile, the control module 210 may then output one or more emergency communications to one or more emergency contacts using one or more communication methods as defined by the data profiles. For example, the control module 210 may generate an electronic mail message, SMS message, or social media message using a pre-configured text-based emergency message, and the control module 210 may output the generated message to one or more emergency contacts through the IP interface 215. As another example, the control module 210 may output a pre-recorded voice message to one or more emergency contacts by delivering the voice message over one or more IP networks 120 or by establishing a call session with an emergency contact through a voice network 135.

In embodiments, emergency contacts and communication methods may be prioritized within the emergency contact data store 225. For example, emergency contacts and communication methods associated with an emergency contact may be assigned a prioritization value or may be prioritized according to the order in which the emergency contacts or communication methods are entered into the emergency contact data store 225. When an alert trigger is identified at the central device 115, the output of emergency communications to one or more emergency contacts may be ordered according to the prioritization of the emergency contacts. Likewise, where more than one communication method is defined for an emergency contact, emergency communications may be output to the emergency contact via each of the defined communication methods in an order according to a prioritization of the communication methods.

Figure 3:
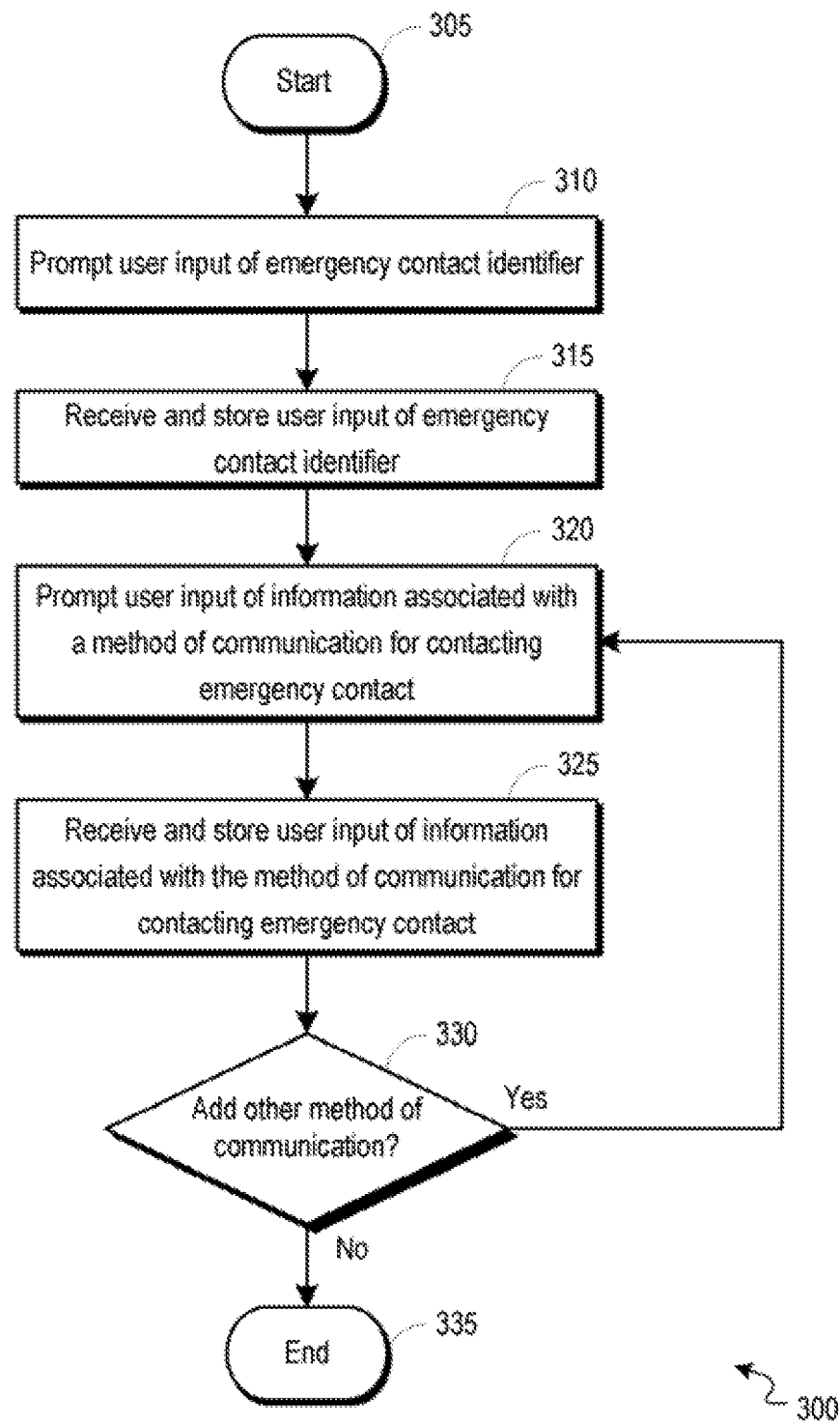
FIG. 3 is a flowchart illustrating an example process operable to facilitate the retrieval of contact information associated with an emergency contact.

FIG. 3 is a flowchart illustrating an example process 300 operable to facilitate the retrieval of contact information associated with an emergency contact. The process 300 can begin at 305, when a user initiates an edit of or addition to information associated with an emergency contact. In embodiments, a central device 115 of FIG. 1 (e.g., at an emergency contact module 220 of FIG. 2) may receive a user request that information for a new emergency contact be added to a list of emergency contacts or that information associated with an existing emergency contact be edited.

At 310, user input of an emergency contact identifier may be prompted. A prompt for the input of an emergency contact identifier may be output by a central device 115 to a user as a GUI. An emergency contact identifier may be any identification of an emergency contact (e.g., name of contact, relationship of contact to a user, etc.).

At 315, user input of an emergency contact identifier may be received and stored. A user may input the emergency contact identifier via a text box provided to the user through a displayed GUI. In embodiments, a central device 115 may receive the user input of the emergency contact identifier (e.g., through a subscriber interface 205 of FIG. 2), and the central device 115 may generate a data profile associated with the emergency contact. For example, the emergency contact module 220 of FIG. 2 may create a data profile that includes the identifier associated with the emergency contact and information associated with one or more methods for communicating with the emergency contact. The data profile may be stored at the emergency contact data store 225 of FIG. 2.

At 320, user input of information associated with a method of communication for contacting an emergency contact may be prompted. A prompt for the input of information associated with a method of communication for contacting the emergency contact may be output by a central device 115 to a user as a GUI. Information associated with a method of communication for contacting the emergency contact may include any information that may be used by the central device 115 to output a communication (e.g., emergency message) to the associated emergency contact (e.g., telephone number, electronic mail address, unique social media identifier, user's social media account information, etc.).

At 325, user input of information associated with a method of communication for contacting an emergency contact may be received and stored. A user may input the information associated with a method of communication for contacting an emergency contact via a text box provided to the user through a displayed GUI. In embodiments, a central device 115 may receive the user input of the information associated with a method of communication for contacting an emergency contact (e.g., through a subscriber interface 205 of FIG. 2), and the central device 115 may associate the method of communication information with a data profile that has been created for the emergency contact. For example, the emergency contact module 220 of FIG. 2 may add the information associated with the method of communicating with the emergency contact to a data profile that has been created for the emergency contact. The data profile associated with the emergency contact may be updated to include the received method of communication information and the updated data profile may be stored at the emergency contact data store 225 of FIG. 2. It should be understood that other information such as priority level of a communication method, emergency message to deliver via a communication method, and other information may be added to and associated with a method of communication.

At 330, a determination is made whether to associate another method of communication with the emergency contact. The determination whether to associate another method of communication with the emergency contact may be made based upon input received from a user. For example, through a displayed GUI, a user may select an option to end the creation or editing of the data profile associated with the emergency contact, or the user may select an option to add information associated with an additional method of communication to the data profile created for the emergency contact.

If, at 330, the determination is made to associate an additional method of communication with the emergency contact, the process 300 may return to 320 where the user is prompted to input information associated with an additional method of communication for contacting the emergency contact.

If, at 330, the determination is made not to associate an additional method of communication with the emergency contact, the process 300 may end at 335.

Figure 4:
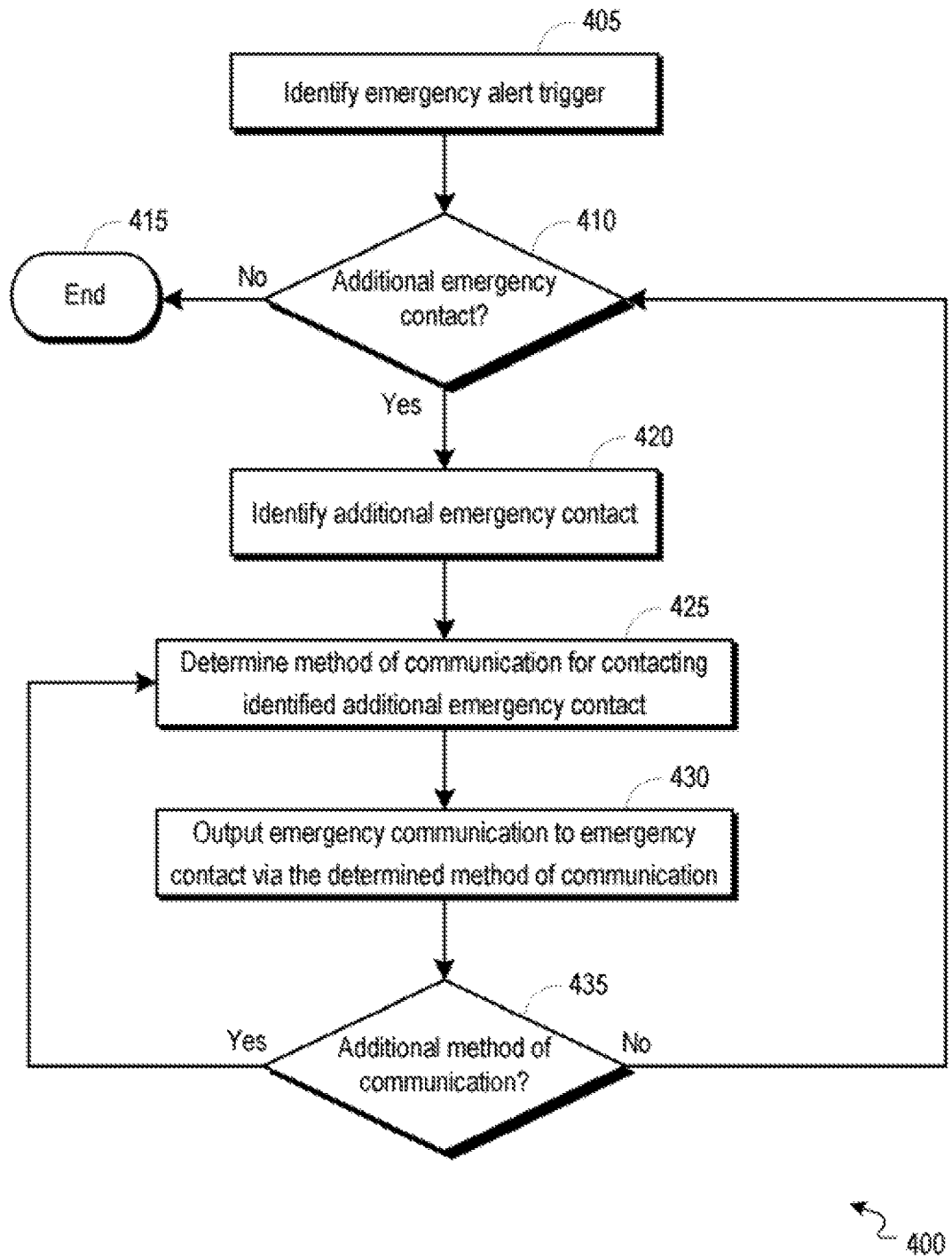
FIG. 4 is a flowchart illustrating an example process operable to facilitate the output of one or more communications to one or more emergency contacts upon the occurrence of an emergency alert trigger.

FIG. 4 is a flowchart illustrating an example process 400 operable to facilitate the output of one or more communications to one or more emergency contacts upon the occurrence of an emergency alert trigger. The process 400 can begin at 405, when an emergency alert trigger is identified. In embodiments, an emergency alert trigger may be identified at a central device 115 of FIG. 1. An emergency alert trigger may include a call being placed to a certain emergency entity (e.g., 911 call or call to any other emergency response entity), an alarm being triggered within a customer premise, or any other signal that may be used to communicate to the central device 115 that an emergency condition has occurred. For example, a control module 210 of FIG. 2 may monitor incoming communications that are received through the subscriber interface 205 of FIG. 2. The control module 210 may monitor one or more telephone lines, and the control module 210 may be configured to detect when an emergency call has been dialed by identifying a unique number associated with an emergency call (e.g., 911).

At 410, a determination is made whether an additional emergency contact is to be contacted. The determination whether an additional emergency contact is to be contacted may be made, for example, by an emergency contact module 220 of FIG. 2. In embodiments, the determination whether an additional emergency contact is to be contacted may be based upon one or more emergency contact data profiles being established at the central device 115, and may be further based upon any number of pre-configured parameters that dictate when an additional emergency contact is to be contacted. For example, if a data profile for at least one emergency contact that has not already been contacted exists at the central device 115, the determination may be made that the at least one emergency contact is to be contacted. It should be understood that various other parameters may control whether an emergency contact is to be contacted, the parameters including, but not limited to certain times of the day during which the emergency contact may be contacted, established associations between emergency contacts and different types of alert triggers (e.g., a setting may require that a certain emergency contact is contacted when a call is placed to an emergency response center, but that the certain emergency contact is not contacted when an alarm is triggered within an associated subscriber premise), whether a connection with a primary or higher priority emergency contact has been successfully established, and others.

If, at 410, the determination is made that no other additional emergency contacts are to be contacted, the process 400 may end at 415.

If, at 410, the determination is made that at least one additional emergency contact is to be contacted, the process 400 may proceed to 420. At 420, an additional emergency contact may be identified. The additional emergency contact may be identified, for example, by the emergency contact module 220 of FIG. 2 and may be identified, for example, from the emergency contact data store 225 of FIG. 2. In embodiments, the identified emergency contact may be the highest priority emergency contact of one or more emergency contacts associated with the central device 115, or may be the emergency contact that has the next highest priority or is otherwise listed after the last emergency contact that was contacted during the current alert triggering event. The emergency contact may be identified from the emergency contact data store 225 as a unique emergency contact identifier (e.g., name of emergency contact, relationship of emergency contact to a user, etc.) associated with a data profile.

At 425, a method of communication for contacting the identified additional emergency contact may be determined. The method of communication may be identified, for example, by the emergency contact module 220 of FIG. 2 and may be identified, for example, from the emergency contact data store 225 of FIG. 2. In embodiments, a data profile stored at the emergency contact data store 225 associated with the identified emergency contact may include one or more methods for communicating with the emergency contact, and may further include information that may be used by the central device 115 to output a communication to the associated emergency contact (e.g., telephone number, electronic mail address, unique social media identifier, user's social media account information, etc.).

In embodiments, the data profile associated with the identified emergency contact may include a plurality of methods for communicating with the emergency contact, and the plurality of communication methods may be organized with the data profile in a sequential order that dictates the order in which the emergency contact is to be contacted using the communication methods. It should be understood that the various communication methods associated with an emergency contact may be prioritized such that the highest priority communication method is listed first within the data profile, thus causing the emergency contact to be contacted via the highest priority communication before being contacted via the other, lower priority communication methods. The determined communication method may be the communication method having the highest priority or that is otherwise listed highest within the data profile with respect to other communication methods associated with the emergency contact, or may be the communication method that has the next highest priority or is otherwise listed after the last communication method that was used to contact the emergency contact during the current alert triggering event. It will be appreciated by those skilled in the relevant art that a central device 115 may output an emergency communication to an emergency contact via multiple communication methods at the same time.

At 430, an emergency communication may be output to the identified emergency contact via the determined method of communication. The emergency communication may be output from the central device 115, for example, through an IP interface 215 of FIG. 2. For example, the emergency communication may be output from the central device 115 and delivered to the emergency contact over an IP network, or may be re-routed from the IP network to a voice network (e.g., at an upstream switching or gateway device).

In embodiments, the emergency communication may include a live or pre-recorded voice message, an electronic mail message, an instant message, a social media message, a SMS message, and any other form of communication that may be delivered from the central device 115 to an emergency contact. The emergency communication may be delivered by establishing an open communication session between a client device (e.g., client device 105 of FIG. 1) associated with the central device 115 and a client device associated with the emergency contact (e.g., user device 125a-c or user device 130a-c), wherein the emergency communication is a real-time communication received by the emergency contact. The emergency communication may be a pre-configured message that is associated with the emergency contact and the communication method, and may be stored at the emergency contact data store 225.

At 435, the determination is made whether the identified emergency contact is to be contacted via an additional method of communication. The determination may be made, for example, by the emergency contact module 220. In embodiments, the determination whether the identified emergency contact is to be contacted via an additional method of communication may be based upon an identification of at least one other communication method within the data profile associated with the identified emergency contact, wherein the emergency contact has not yet been contacted via the at least one other communication method. For example, if a data profile for the identified emergency contact includes a communication method that has not already been used to contact the emergency contact, the determination may be made that the emergency contact is to be contacted via the at least one other communication method.

The determination whether the identified emergency contact is to be contacted via an additional method of communication may be further based upon one or more parameters dictating when an emergency contact should or should not be contacted via certain communication methods. For example, parameters dictating whether a communication method is to be used to contact an emergency contact may include, but are not limited to certain times of the day during which the communication method may be used to contact the emergency contact, established associations between communication methods and different types of alert triggers (e.g., a setting may require that a certain communication method be used when a call is placed to an emergency response center, but that the certain communication method is not used when an alarm is triggered within an associated subscriber premise), whether a primary or higher priority communication method has been used to successfully deliver an emergency communication to the emergency contact, and others.

If, at 435, the determination is made that the emergency contact is to be contacted via an additional method of communication, the process can return to 425 where a next method of communication for contacting the identified emergency contact may be determined. The next method of communication that is determined may be the communication method that is listed next in the data profile associated with the identified emergency contact, or may otherwise be the communication method having the next highest priority level.

If, at 435, the determination is made that the emergency contact is not to be contacted via an additional method of communication, the process 400 can return to 410, where the determination is made whether an additional emergency contact is to be contacted.

Figure 5:
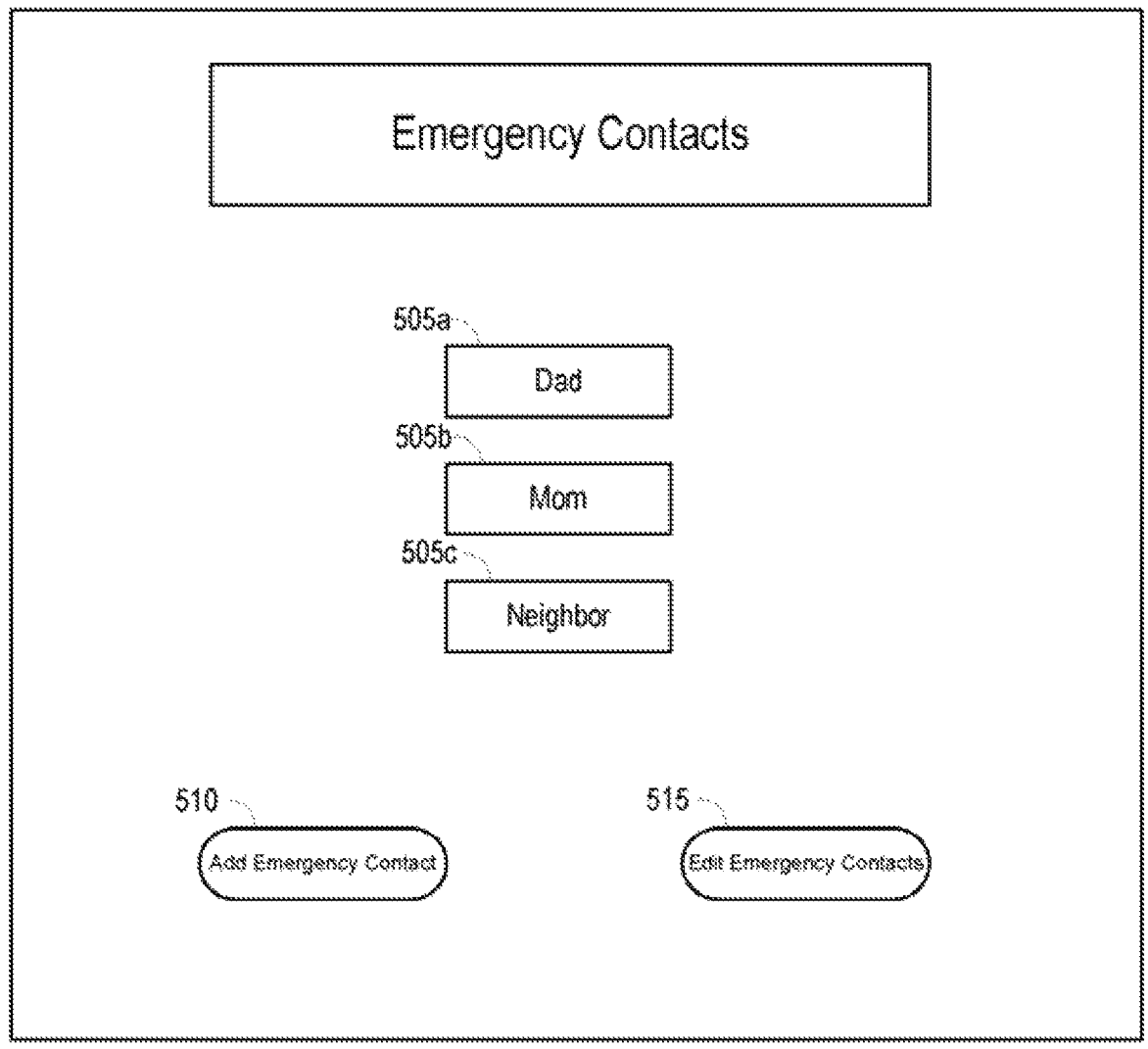
FIG. 5 is an example illustration of a graphical user interface that may be used to associate one or more emergency contacts with a device or to edit information for one or more emergency contacts associated with the device.

FIG. 5 is an example illustration of a graphical user interface 500 that may be used to associate one or more emergency contacts with a device or to edit information for one or more emergency contacts associated with the device. The GUI 500 may display each of one or more emergency contacts 505a-c that are currently associated with a device (e.g., central device 115 of FIG. 1). Each of the one or more emergency contacts 505a-c may be identified within the GUI 500 using an emergency contact identifier (e.g., name of the emergency contact, relationship of the emergency contact to a user, etc.) associated with the emergency contact.

In embodiments, the GUI 500 may provide a user with the option to associate a new emergency contact with the central device 115 or to edit information for an emergency contact that is already associated with the central device 115. For example, the GUI 500 may include an add contact button 510 (e.g., "Add Emergency Contact") that when selected by a user causes a new GUI to be displayed that may allow a user to add information associated with a new emergency contact. As another example, the GUI 500 may include an edit contact button 515 (e.g., "Edit Emergency Contacts") that when selected by a user causes a new GUI to be displayed that may allow a user to edit or add to existing information associated with one or more emergency contacts already associated with the central device 115.

It should be understood that the GUI 500 may be output to a display device connected to or otherwise associated with the central device 115.

Figure 6:
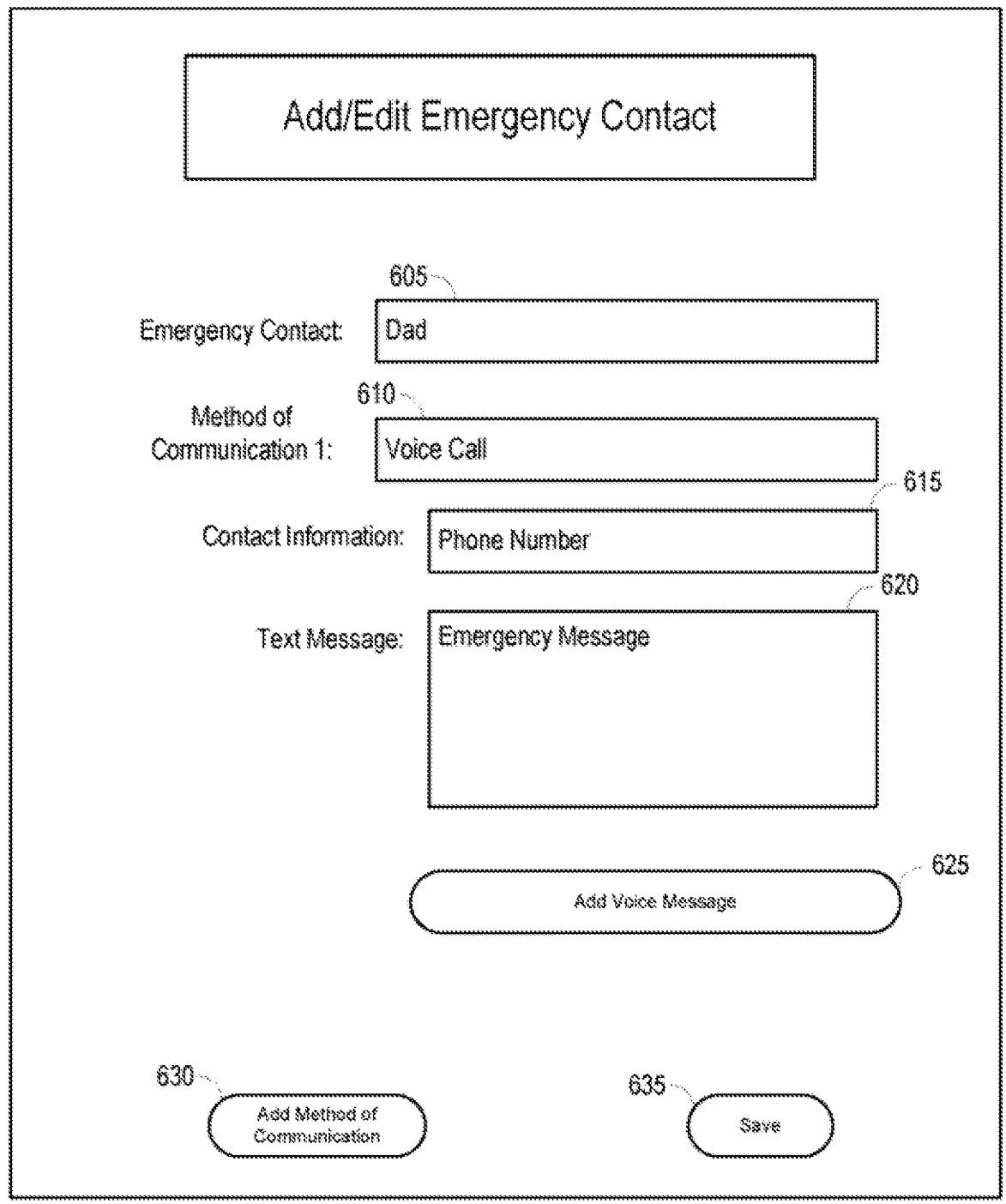
FIG. 6 is an example illustration of a graphical user interface that may be used to associate an emergency contact with a device and to associate one or more communication methods with the emergency contact.

FIG. 6 is an example illustration of a graphical user interface 600 that may be used to associate an emergency contact with a device and to associate one or more communication methods with the emergency contact. In embodiments, the GUI 600 may be displayed to a user in response to the user selecting the add contact button 510 or the edit contact button 515 within the GUI 500 of FIG. 5. It should be understood that the GUI 600 may be output to a display device connected to or otherwise associated with the central device 115.

The GUI 600 may include an emergency contact text box 605, within which a user may input a unique emergency contact identifier (e.g., name of the emergency contact, relationship of the emergency contact to a user, etc.) to be associated with the new emergency contact. The GUI 600 may include one or more communication method text boxes 610, within which a user may input or define one or more methods of communication (e.g., telephone call, text message, electronic mail, social media message, etc.) to be used to deliver an emergency message to the new emergency contact. The GUI 600 may include a contact information text box 615, within which a user may input contact information such as a unique identifier (e.g., telephone number, electronic mail address, social media identifier, user's social media account information, etc.) that may be used by the central device 115 to deliver an emergency message to the emergency contact via the associated communication method. It should be understood that information entry techniques such as radio buttons, drop down tables, and others may be used by a user to associate information with an emergency contact.

The GUI 600 may include a text message text box 620, within which a user may input the text that is to be delivered to the emergency contact via the method of communication when an alert triggering event occurs. The GUI 600 may also include a voice message button 625, which the user may select to record or upload a voice message, and the recorded voice message may be delivered to the emergency contact via the method of communication when an alert triggering event occurs.

In embodiments, the GUI 600 may provide a user with the option to add additional methods of communication to be used to deliver an emergency message to the emergency contact. For example, the GUI 600 may include an add communication method button 630 that when selected by a user causes one or more additional text boxes to be displayed within the GUI 600, wherein the additional text boxes may be used to input or define additional communication methods and associated information and messages. The GUI 600 may further include a save button 635 that when selected causes the information that is input into the text boxes (e.g., emergency contact text box 605, communication method text box 610, contact information text box 615, and text message text box 620) and any recorded or uploaded voice messages to be associated with the emergency contact and stored as a data profile (e.g., at an emergency contact data store 225 of FIG. 2 of the central device 115).

Figure 7:
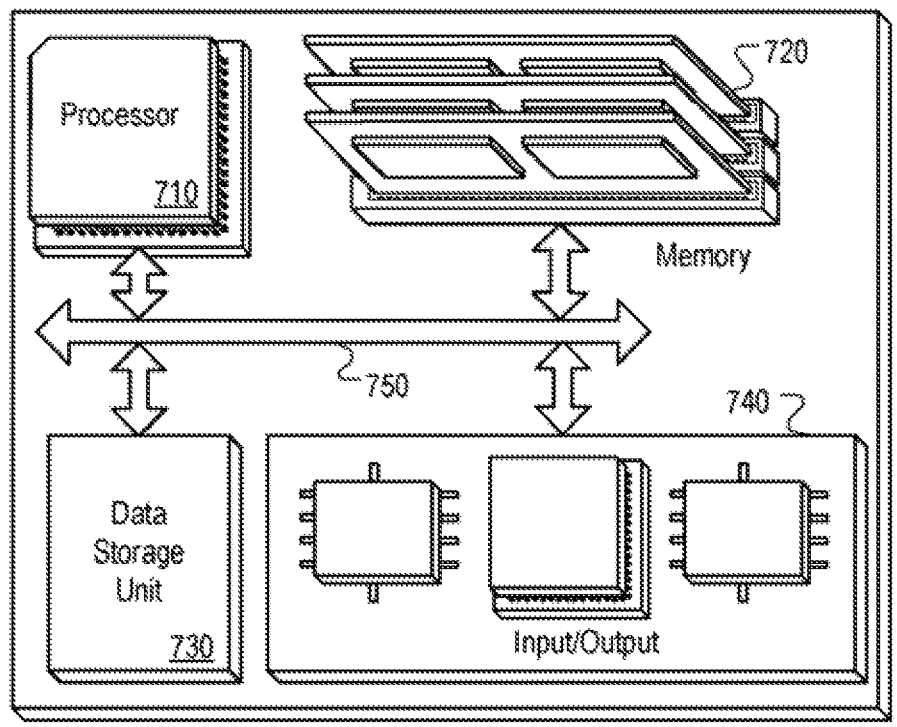
FIG. 7 is a block diagram of a hardware configuration operable to facilitate the output of communications to additional emergency contacts upon the occurrence of an alarm triggering event.

FIG. 7 is a block diagram of a hardware configuration 700 operable to facilitate the output of communications to additional emergency contacts upon the occurrence of an alarm triggering event. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a client device 105 of FIG. 1 (e.g., television, STB, computer, mobile device, tablet, telephone, etc.). In embodiments, the input/output device can include driver devices configured to send communications to, and receive communications from one or more networks (e.g., local network 110, IP network(s) 120, voice network 135, etc.).

Those skilled in the art will appreciate that the invention improves upon methods and systems for outputting an alert to emergency contacts. Methods, systems, and computer readable media can be operable to facilitate the output of communications to additional emergency contacts upon the occurrence of an alarm triggering event. A central device may be configured with one or more data profiles associated with one or more emergency contacts, and each data profile may include emergency contact information associated with one or more methods for communicating a message to each respective emergency contact. When the device identifies an alert trigger within one or more communications passing through the device, the device may output one or more emergency messages to one or more of the emergency contacts according to the one or more stored data profiles.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
providing, via a central device, a local network for the central device and one or more client devices;
storing one or more data profiles, each of the one or more data profiles associated with an emergency contact, and wherein each of the one or more data profiles includes an emergency contact identifier, one or more emergency contact devices, one or more methods for communicating with the emergency contact via the one or more emergency contact devices, contact information associated with each of the one or more methods for communicating with the emergency contact, one or more emergency contact parameters for contacting the emergency contact, and one or more emergency messages;
monitoring, via the central device, client device traffic of the one or more client devices transmitted through the local network;
identifying, via the central device, a signal within the client device traffic as an emergency communication;
determining that at least one emergency contact parameter is met, wherein the at least one emergency contact parameter controls whether a message is output to one or more emergency contact devices;
identifying, via the central device, a data profile of the one or more stored data profiles, based on the at least one emergency contact parameter, wherein the identifying includes:
determining one or more emergency contact devices associated with the identified data profile;
determining one or more communication methods associated with each of the determined one or more emergency contact devices; and
outputting one or more messages to at least a respective one of the determined one or more emergency contact devices using at least one of the one or more communication methods associated with the respective emergency contact device, wherein the one or more emergency contact devices is located outside an area serviced by the local network, wherein one or more messages are output to a respective emergency contact device using a plurality of communication methods in an order based on a prioritization of the communication methods that are associated with the respective emergency contact device.

2. The method of claim 1, wherein identifying the emergency communication comprises:
matching a string of dialed numbers by the one or more client devices with a telephone number designated at the central device as an emergency telephone number.

3. The method of claim 1, wherein one or more of the messages comprise audio recordings.

4. The method of claim 1, wherein one or more of the messages are output to one or more emergency contact devices as a short message service message.

5. The method of claim 1, wherein one or more of the messages are output to one or more emergency contact devices as a message associated with a social media account.

6. The method of claim 1, wherein one or more communication methods are associated with an emergency contact device based upon user input received through a graphical user interface.

7. The method of claim 1, wherein the one or more messages are output to the one or more emergency contact devices in an order based upon a prioritization of the emergency contact devices.

8. An apparatus comprising:
a memory configured to store one or more data profiles, each of the one or more data profiles associated with an emergency contact, and wherein each of the one or more data profiles includes an emergency contact identifier, one or more emergency contact devices, one or more methods for communicating with the emergency contact via the one or more emergency contact devices, contact information associated with each of the one or more methods for communicating with the emergency contact, one or more emergency contact parameters for contacting the emergency contact, and one or more emergency messages;
an interface configured to be operated on a central device and used to receive communications from one or more associated devices, wherein the interface is further configured to provide a local network for the central device and one or more client devices and monitor client device traffic of the one or more client devices transmitted through the local network, wherein the interface is further configured to identify a signal within the client device traffic as an emergency communication;

a module configured to:

determine that at least one emergency contact parameter is met, wherein the at least one emergency contact parameter controls whether a message is output to one or more emergency contact devices;

identify a data profile of the one or more stored data profiles, based on the at least one emergency contact parameter, wherein the identifying includes:

determine one or more emergency contact devices associated with the identified data profile;

determine one or more communication methods associated with each of the determined one or more emergency contact devices; and the interface configured to be used to output one or more messages to at least a respective one of the determined one or more emergency contact devices using at least one of the one or more communication methods associated with the respective emergency contact device, wherein the one or more emergency contact devices is located outside an area serviced by the local network, wherein one or more messages are output to a respective emergency contact device using a plurality of communication methods in an order based on a prioritization of the communication methods that are associated with the respective emergency contact device.

9. The apparatus of claim 8, wherein the interface is configured to identify the emergency communication by matching a string of dialed numbers by the one or more client devices with a telephone number designated as an emergency telephone number.

10. The apparatus of claim 8, wherein one or more of the messages comprise audio recordings.

11. The apparatus of claim 8, wherein one or more of the messages are output to one or more emergency contact devices as a short message service message.

12. The apparatus of claim 8, wherein one or more of the messages are output to one or more emergency contact devices as a message associated with a social media account.

13. The apparatus of claim 8, wherein one or more communication methods are associated with an emergency contact device based upon user input received through a graphical user interface.

14. One or more non-transitory computer readable media having instructions operable to cause one or more processors to perform the operations comprising:

providing, via a central device, a local network for the central device and one or more client devices;

storing one or more data profiles, each of the one or more data profiles associated with an emergency contact, and wherein each of the one or more data profiles includes an emergency contact identifier, one or more emergency contact devices, one or more methods for communicating with the emergency contact via the one or more emergency contact devices, contact information associated with each of the one or more methods for communicating with the emergency contact, one or more emergency contact parameters for contacting the emergency contact, and one or more emergency messages;

monitoring, via the central device, client device traffic of the one or more client devices transmitted through the local network;

identifying, via the central device, a signal within the client device traffic as an emergency communication;

determining that at least one emergency contact parameter is met, wherein the at least one emergency contact parameter controls whether a message is output to one or more emergency contact devices;

identifying, via the central device, a data profile of the one or more stored data profiles, based on the at least one emergency contact parameter, wherein the identifying includes:

determining one or more emergency contact devices associated with the identified data profile;

determining one or more communication methods associated with each of the determined one or more emergency contact devices; and outputting one or more messages to at least a respective one of the determined one or more emergency contact devices using at least one of the one or more communication methods associated with the respective emergency contact device, wherein the one or more emergency contact devices is located outside an area serviced by the local network, wherein one or more messages are output to a respective emergency contact device using a plurality of communication methods in an order based on a prioritization of the communication methods that are associated with the respective emergency contact device.

15. The one or more non-transitory computer-readable media of claim 14, wherein identifying the emergency communication comprises:

matching a string of dialed numbers by the one or more client devices with a telephone number designated at the central device as an emergency telephone number.

16. The one or more non-transitory computer-readable media of claim 14, wherein one or more of the messages comprise audio recordings.

17. The one or more non-transitory computer-readable media of claim 14, wherein one or more of the messages are output to one or more emergency contact devices as a short message service message.

18. The one or more non-transitory computer-readable media of claim 14, wherein one or more of the messages are output to one or more emergency contact devices as a message associated with a social media account.

19. The one or more non-transitory computer-readable media of claim 14, wherein one or more communication methods are associated with an emergency contact device based upon user input received through a graphical user interface.

* * * * *